United States Patent [19]

Boulet

[11] Patent Number: 5,255,295
[45] Date of Patent: Oct. 19, 1993

[54] DEVICE FOR MEASURING THE TEMPERATURE OF THE PRIMARY COOLANT OF A NUCLEAR REACTOR, WITH ACCELERATED INTERNAL FLOW

[75] Inventor: Michel Boulet, Cormeilles-en-Parisis, France

[73] Assignee: Framatome, Courbevoie, France

[21] Appl. No.: 877,778

[22] Filed: May 4, 1992

[30] Foreign Application Priority Data

May 3, 1991 [FR] France ............... 9105484

[51] Int. Cl.⁵ ................................. G21C 17/00
[52] U.S. Cl. ........................... 376/247; 376/245
[58] Field of Search ........... 376/247, 245; 136/202, 136/218; 374/179, 208; 976/DIG. 239

[56] References Cited

U.S. PATENT DOCUMENTS

| | | | |
|---|---|---|---|
| 3,383,919 | 5/1968 | Marcy et al. | 376/247 |
| 4,132,115 | 1/1979 | Benemann et al. | 73/349 |
| 4,175,438 | 11/1979 | Wenzl et al. | 73/359 R |
| 4,666,656 | 5/1987 | Bertrand | 376/247 |
| 4,670,212 | 6/1987 | Geoffray et al. | 376/247 |
| 4,778,538 | 10/1988 | Lyman | 136/230 |
| 4,987,749 | 1/1991 | Baier | 62/222 |

FOREIGN PATENT DOCUMENTS 2518747 6/1983 France.
734702 8/1955 United Kingdom.
2003659 3/1979 United Kingdom.

*Primary Examiner*—Daniel D. Wasil
*Assistant Examiner*—Meena Chelliah
*Attorney, Agent, or Firm*—Pollock, Vande Sande & Priddy

[57] ABSTRACT

The measurement device (3) comprises a metallic body (5) fixed in the wall of a reactor coolant pipe (1). The metallic body (5) is pierced in order to constitute a first channel (8) communicating with the inner volume of the pipe (1) by a plurality of coolant inlet openings (14) and a second channel (12) communicating with the inner volume of the pipe (1) by at least one coolant outlet opening (15) and enclosing the measurement probe (20) in a zone situated between the end of the second channel (12), which end is connected to the first channel (8), and the coolant outlet opening (15). The coolant inlet openings (14) are disposed on one frontal face of the metallic body (5) in the flow direction (6) of the coolant, and the outlet opening (15) is located on an opposite face thereof.

10 Claims, 3 Drawing Sheets

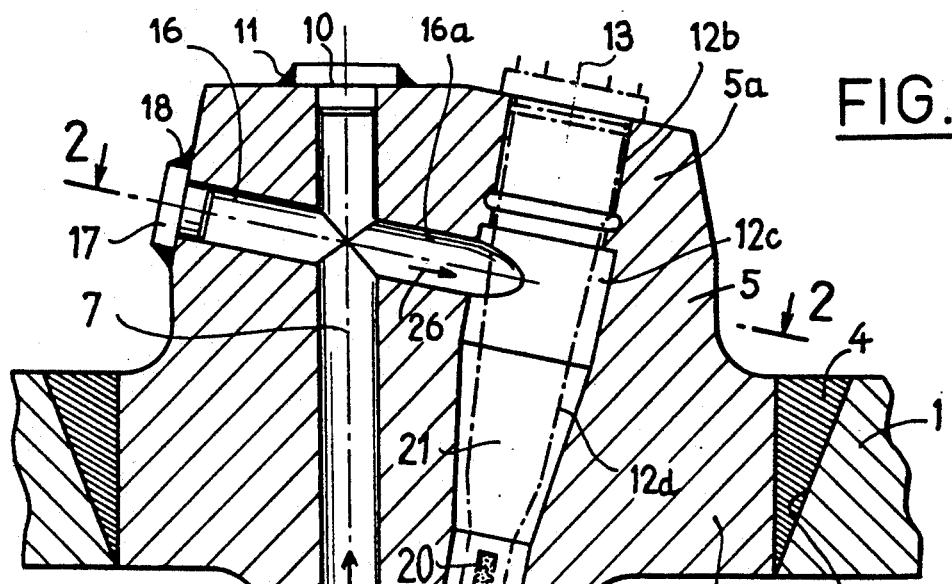
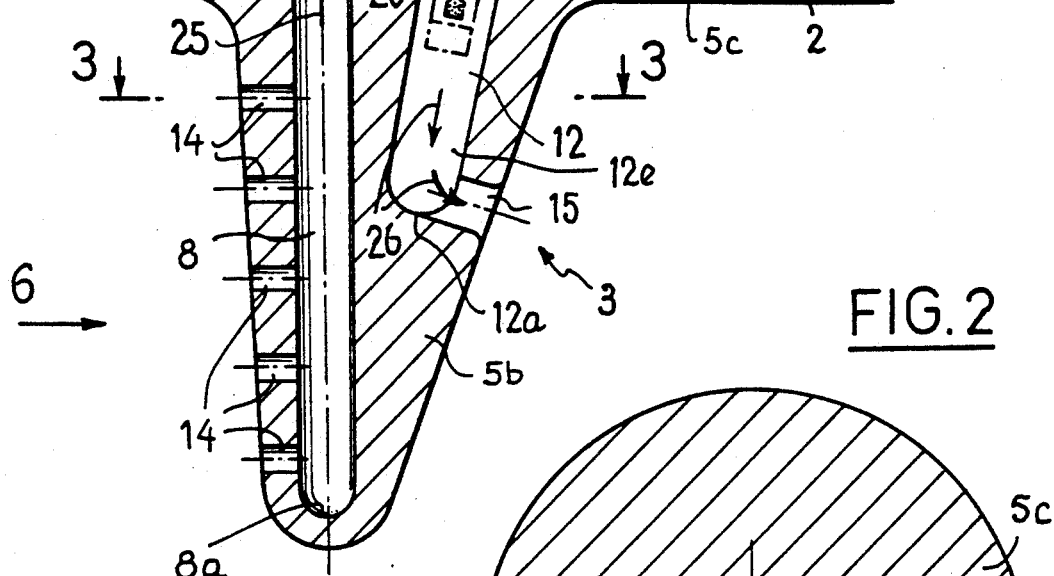
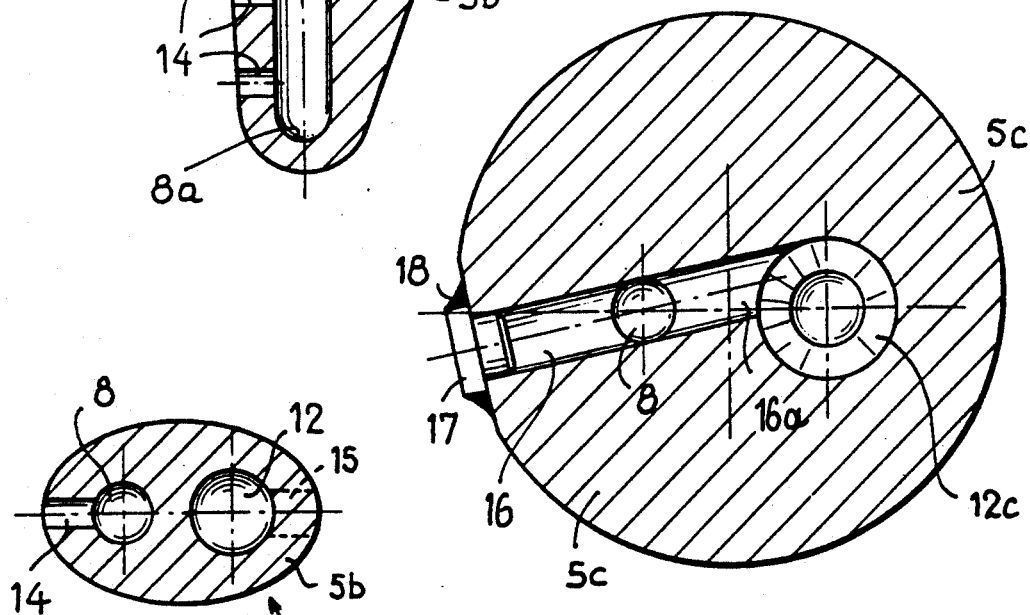

DEVICE FOR MEASURING THE TEMPERATURE OF THE PRIMARY COOLANT OF A NUCLEAR REACTOR, WITH ACCELERATED INTERNAL FLOW

FIELD OF THE INVENTION

The invention relates to a device for measuring the temperature of the primary coolant of a nuclear reactor, with accelerated internal flow.

BACKGROUND OF THE INVENTION

Nuclear reactors using a primary coolant of the core of the reactor, such as nuclear reactors cooled by pressurized water, comprise a vessel in which is disposed the core of the reactor constituted by fuel rods and a primary cooling system comprising at least one loop in which is disposed a steam generator inside which the primary coolant of the reactor provides the heating and the vaporization of the feedwater. Each of the loops of the primary circuit comprises pipes of large diameter and thickness in which the primary coolant flows.

One of the pipes, called the hot leg, connects the vessel to the steam generator and provides the transfer of the heated primary coolant in contact with the core to the primary part of the steam generator.

Another pipe, called the cold leg, provides the return of the coolant to the vessel, after its passage through the steam generator.

In order to provide the control and the operational monitoring of the nuclear reactors, it is necessary to measure the temperature of the primary coolant which absolutely has to be maintained within a predetermined range, in order to provide a satisfactory operation of the nuclear reactor.

There are known devices for measuring the temperature of the primary coolant of a nuclear reactor, comprising a metallic body called a scoop fixed in the wall of a reactor coolant pipe, in such a manner that a portion projects inside the reactor coolant pipe in the form of a thimble and pierced by at least one channel communicating with the inner volume of the reactor coolant pipe by a plurality of openings distributed in a substantially radial direction in relation to the pipe. A temperature measurement probe is fixed on the inside of the channel of the scoop, in such a manner as to come into contact with the primary coolant penetrating into the channel of the scoop by the openings traversing the wall of the thimble.

It may also be necessary to provide an opening for outflow of the coolant traversing the wall of the thimble in a zone situated opposite the openings for inflow of the coolant.

These devices make it possible to carry out direct measurement of the temperature of the primary coolant, taking into account the stratification existing in the primary coolant pipe and manifested by a temperature gradient in the radial direction, owing to the distribution of openings for inflow of the coolant into the scoop.

However, the temperature measurement obtained is not entirely reliable and the response time of the device is not extremely rapid, due to the fact that the coolant is not mixed and homogenized efficiently before the measurement and that its speed of circulation inside the channel of the scoop is relatively low.

There is also known, from French Patent Application 90 16493, filed Dec. 28, 1990 by the present applicant, a device for measuring the temperature of the primary coolant of a pressurized water nuclear reactor which comprises at least three elements for sampling coolant traversing the wall of a substantially horizontal portion of the hot leg, which elements are distributed on the periphery of the hot leg, which element is connected by a pipe outside the hot leg, to each of the sampling elements.

A temperature probe is disposed on the inside of each of the sampling elements. Moreover, a temperature probe may be also disposed inside the element for reintroducing the fluid.

This device makes it possible to carry out a good mixing of the primary coolant before the measurement, but the flow rate of the primary coolant in the measurement circuit is relatively low, so that the response time of the measuring device is not extremely rapid.

Furthermore, the device has a relatively complex structure and comprises pipes on the outside of the reactor coolant pipe. Difficulties may arise thereby, in particular when a thermal insulation material is placed around the reactor coolant pipe.

SUMMARY OF THE INVENTION

The object of the invention therefore is a device for measuring the temperature of the primary coolant of a nuclear reactor comprising a vessel in which the core of the reactor is disposed and a primary cooling system having at least one loop in which a steam generator is disposed and which comprises pipes in which the primary coolant of the reactor flows, the measuring device comprising a metallic body fixed in the wall of a reactor coolant pipe, in such a manner that a portion thereof projects inside the reactor coolant pipe, pierced by at least one channel communicating with the inner volume of the reactor coolant pipe by openings and enclosing a temperature measurement probe. The device makes it possible to take reliable temperature measurements with a rapid response time and has a simple structure making it easy to mount on a pipe of the primary cooling system.

For this purpose, the metallic body of the device according to the invention is pierced by two channels in a substantially radial direction in relation to the reactor coolant pipe, which channels are connected to each other in the vicinity of one of their ends, namely, a first channel communicating with the inner volume of the pipe by a plurality of coolant inlet openings distributed in a substantially radial direction of the metallic body, and a second channel communicating with the inner volume of the pipe by at least one coolant outlet opening and enclosing the temperature measurement probe, in a zone situated between the end of the second channel connected to the first channel, and the outlet opening.

BRIEF DESCRIPTION OF THE DRAWINGS

In order to make the invention more clearly understood, there will now be described, by way of example, with reference to the attached drawings, several embodiments of a measuring device according to the invention.

FIG. 1 is a view in axial cross-section of a first embodiment of the device according to the invention.

FIG. 2 is a view in cross-section along line 2—2 of FIG. 1.

FIG. 3 is a view in cross-section along line 3—3 of FIG. 1.

DESCRIPTION OF PREFERRED EMBODIMENTS

Figure 4:
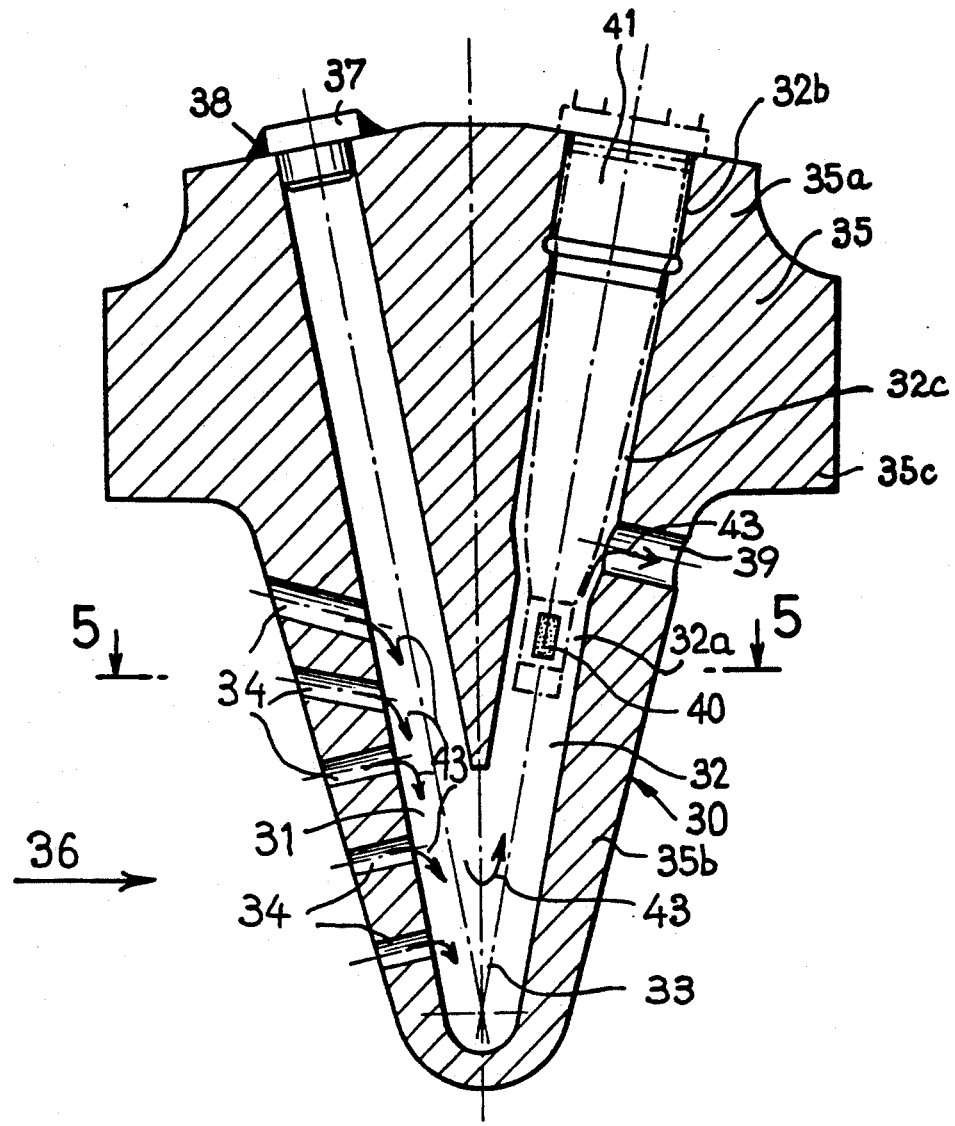
FIG. 4 is a view in axial cross-section of a second embodiment of the device according to the invention.

FIG. 1 shows a portion of a reactor coolant pipe 1 of a pressurized water nuclear reactor, which pipe is constituted by a hot leg connecting the vessel to the steam generator of the nuclear reactor.

The hot leg, which has a large diameter and a large wall thickness, is traversed by an opening 2 in which the temperature measuring device 3 according to the invention, constructed in the form of a scoop, is inserted and fixed by a welded joint 4.

The scoop comprises a solid metallic body 5 having an external portion 5a projecting outside the reactor coolant pipe 1 when the metallic body 5 is inserted and fixed in the opening 2, an internal portion 5b projecting inside the pipe 1 and a cylindrical intermediate portion 5c engaged in the wall of the pipe, by which the metallic body 5 is fixed on the pipe.

The portion 5c of the metallic body 5 has a substantially cylindrical form of circular cross-section, as may be seen in FIG. 2. The axis of this portion 5c, which defines the axial direction of the metallic body 5, is placed in a substantially radial disposition in relation to the pipe 1 when mounting and fixing the measurement device 3 on the pipe.

The internal portion 5b of the metallic body projecting inside the pipe 1 has a substantially conical shape and an ellipsoidal cross-section, as may be seen in FIG. 3. This shape makes it possible to limit the head losses, during the flow of primary coolant inside the pipe 1, in the axial direction of the pipe 1 and in the direction of arrow 6.

The metallic body 5 of the scoop is pierced in an axial direction 7 corresponding to a radial direction of the pipe 1, so as to constitute a first linear channel 8 comprising a closed end 8a in the vicinity of the end of the internal portion 5b of the metallic body 5 and emerging, on the outside of the pipe 1, at the external surface of the portion 5a of the metallic body 5. The end of the channel 8 emerging on the outside of the pipe 1 is closed by a plug 10 sealingly fixed by an annular welded joint 11, on the external portion 5a of the metallic body 5.

The metallic body 5 is also pierced in a direction 13 slightly inclined in relation to the axial direction 7 and substantially radial in relation to the pipe 1, in order to constitute a second channel 12 comprising a first, closed end 12a inside the internal portion 5b of the metallic body 5 and a second end emerging, outside the pipe 1, on the outer surface of the external portion 5a of the metallic body 5.

The internal wall of the channel 12 is machined so as to constitute successively, between its emerging end and its closed end 12a, a tapped portion 12b, a smooth cylindrical portion of large diameter 12c, a frustoconical portion 12d and a smooth cylindrical portion of small diameter 12e.

The metallic body 5 of the scoop is pierced in transverse directions so as to provide a plurality of coolant inlet openings 14 bringing the inner volume of the pipe 1 into communication with the first channel 8. These openings are distributed along the axial direction of the metallic body 5 corresponding to a radial direction of the pipe 1.

The metallic body 5 is also pierced so as to provide a coolant outlet opening 15 bringing the end 12a of the second channel 12 into communication with the inner volume of the pipe 1.

Finally, the metallic body 5 is pierced in an oblique direction in order to constitute a linear channel 16 bringing the channels 8 and 12 into communication, by a connecting portion 16a situated inside the external portion 5a of the metallic body, in a zone of the channels 8 and 12 remote from their closed ends 8a and 12a.

The channel 16, which emerges at one of its ends at the external face of the portion 5a of the metallic body 5, on the outside of the pipe 1, is closed by a plug 17 which is sealingly fixed by an annular welded joint 18 on the external surface of the portion 5a of the metallic body.

As may be seen in FIG. 2, the connecting portion 16a of the channel 16 emerges in the large diameter smooth portion 12c of the channel 12 in an eccentric position and has a direction tangential in relation to this smooth portion.

A probe support 21, of cylindro-frustoconical shape, in the end portion of which a temperature measurement probe 20 is fixed, is mounted inside the channel 12 in such a manner that the measurement probe 20 is disposed in the small diameter smooth portion 12e situated at the end of the channel 12.

The probe support 21 comprises a threaded portion which is engaged by screwing into the tapped portion 12b of the channel 12. The sealed fixing of the probe support 21 in the channel 12 is obtained by an annular joint weld between the external portion of the probe support 21 bearing on the external portion 5a of the metallic support 5 and the external surface of the support 5.

Between its threaded portion and its end portion in which the measurement probe 20 is mounted, the probe support 21 has a frustoconical shape, such that it leaves a free annular surrounding space in the large diameter portion 12c of the channel 12, this annular space, into which emerges the connecting portion 16a of the channel 16, constituting a mixing chamber for the primary coolant in which the primary coolant is mixed and homogenized by cyclone effect.

The operation of the measurement device shown in FIGS. 1, 2 and 3 will now be described.

During the operation of the nuclear reactor, pressurized water flows at high speed (of the order of 14 m/s) inside the hot leg 1 in the axial direction and in the direction of the arrow 6. A portion of the flow of pressurized water penetrates through openings 14 into channel 8 of the scoop.

The distribution of the openings 14 in the radial direction of the pipe 1 makes it possible to sample the pressurized cooling water in various stratified layers at different temperatures, which layers are formed in the cooling water flowing in the pipe 1. The water sampled at various levels by the openings 14 flows into the first channel 8 in the direction of its external end closed by the plug 10 (arrow 25).

The sampled water then flows into the connecting portion 16a of the channel 16 (arrow 26), in such a manner as to penetrate into the mixing chamber 12c of the channel 12.

The flow of sampled water penetrates into the chamber 12c in a direction tangential to the wall of the chamber and into a zone eccentric to the axis of the chamber. The flow of sampled water cooling is caused to rotate about the axis 13 of the channel 12, in the annular space situated on the periphery of the probe support 21 and constituting the mixing chamber of the portion 12c of the channel 12.

Mixing and a homogenization of the samplings constituting the flow of cooling water reaching into the channel 12 is thus brought about.

The flow of sampled and temperature-homogenized water flows inside the channel 12, on the periphery of the probe support 21, in the direction of the end portion 12a of the channel 12. The flow of sampled water reaching the end 12a of the channel 12 is reinjected into the inner volume of the reactor coolant pipe 1 through opening 15.

The flow of the coolant at high speed in the axial direction and in the direction of the arrow 6 causes a suction effect at the position of the reinjection opening 15.

The sampled coolant therefore flows at an accelerated speed inside the channels 8, 16a and 12.

The measurement probe 20 is therefore swept by temperature-homogenized water flowing at a substantially greater speed than in the case of devices known in the prior art. This speed is generally of the order of 5 to 7 m/s. As a result, the response time of the temperature measurement device is substantially reduced and the temperature measurement made by the probe 20 is much more representative of the instantaneous precise value of the temperature of the coolant in the hot leg 1.

To make the measurements more representative, several measurement devices such as are shown in FIGS. 1, 2 and 3 may be placed at 120° intervals around the axis of the reactor ocoolant pipe.

Preferably, the measurement devices are placed in the same cross-sectional plane of the pipe. In order to obtain a value representative of the temperature of the coolant, the average of the values measured by the three measurement devices disposed at 120° around the pipe is calculated.

To increase the operating reliability of the measurement device shown in FIG. 1, it is possible to use a backup probe placed in that portion of the first channel 8 which is opposite its closed end 8a. This backup probe may be mounted in a support which is engaged and fixed in a sealed manner in the end portion of the channel 8, in lieu of the plug 10. The backup probe makes it possible to carry out, in case of the failure of probe 20, a measurement of the temperature of the cooling water sampled by the scoop. This backup probe does not make it possible to benefit from the mixing of the coolant by cyclone effect in the chamber 12c, but the mixing of the samplings is sufficient for the measurement to be representative of the temperature of the coolant in the pipe 1.

It is also possible to replace the plug 17 for sealing the end of the channel 16 by a flow rate measurement device employing propagation of ultrasound in the flowing coolant.

Thus it is possible to check whether the sampled water is flowing correctly inside the scoop and to measure its flow rate.

Figure 5:
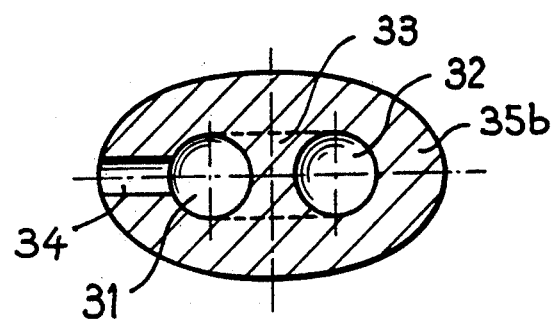
FIG. 5 is a view in cross-section along line 5—5 of FIG. 4.

FIGS. 4 and 5 show a second embodiment of a scoop 30 of a measurement device according to the invention.

The scoop 30 is constituted by a metallic body 35 whose general shape is similar to the shape of the metallic body 5 of the scoop 3 shown in FIG. 1.

The metallic body 35 is fixed in the wall of a reactor coolant pipe of a pressurized water nuclear reactor, and preferably in the wall of a hot leg, via a cylindrical median portion 35c. The metallic body 35 also comprises an external portion 35a projecting outside the pipe of the primary cooling system, and an internal portion 35b projecting inside the reactor coolant pipe and having an ellipsoidal-shape cross-section as shown in FIG. 5.

The coolant of the reactor flows in the reactor coolant pipe to which the scoop 30 is fixed, in the direction shown by arrow 36.

The metallic body 35 is pierced to provide a first linear channel 31 and a second linear channel 32 which are concurrent at their ends situated on the inside of the portion 35b of the scoop so as to constitute a common portion 33.

The channels 31 and 32 form a sharp V with an angle of the order of 20°, and emerge, at their ends opposite the common portion 33, at the external face of the portion 35a of the scoop.

The channel 31 is closed at its end emerging at the external face of the scoop by a plug 37 fixed on the external surface of the scoop by an annular welded joint 38.

Internal portion 35b of metallic body 35 is pierced by openings 34 bringing the first channel 31 into communication with the inner space of the pipe, in and adjacent to the common portion 33.

The openings 34 are distributed along the length of the portion 35b of the body 35, in a direction substantially radial to the pipe. The openings 34 are linear and are slightly and variably inclined in relation to the direction 36 of flow of the coolant in the pipe. The openings 34 are disposed on the frontal face of the portion 35b of the scoop which comes into contact with the flow of coolant flowing in the direction of the arrow 36.

The second channel 32 is internally machined so as to constitute, successively, from its external end emerging at the external surface of the scoop to its end emerging at the common portion 33, a tapped portion 32b, a frustoconical smooth portion 32c and a cylindrical end portion 32a terminating in the portion 33 common to the channels 31 and 32.

The internal portion 35b of the metallic body 35 is pierced by a coolant outlet opening 39 bringing the channel 32, at the transition between its portions 32a and 32c, into communication with the inner volume of the pipe.

A temperature probe 40 fixed on a probe support 41 is placed in the portion 32a of the channel 32. The probe support 41 is screwed into the channel 32, by means of a threaded portion engaged in the tapped portion 32b. The support 41 is sealingly fixed on the metallic body 34 by a welded joint on a protruding portion of the support 41 and on the upper surface of the metallic body 35.

The operation of the measurement device 30 shown in FIGS. 4 and 5 will now be described.

A fraction of the coolant flowing in the reactor coolant pipe in the direction of the arrow 36 penetrates into the channel 31 through the openings 34 and flows inside the scoop in the direction of the portion 33 common to the channels 31 and 32 and then into the portion 32a of the channel 32 so as to reemerge from the scoop through outlet opening 39 (arrows 43).

As outlet opening 39 is disposed on the metallic body, opposite its frontal face which comes into contact with the flow of coolant 36, there occurs a suction at the position of the opening 39, a sucking action inside the channel 32 and a negative pressure inside the channels in which the cooling water flows.

Thus, the flow of coolant which comes into contact with the measurement probe 40 at the completion of its travel inside the scoop is greatly accelerated, and a measurement of the temperature is obtained with a reduced response time.

There also occurs a mixing of the coolant samplings penetrating, through openings 34, to the inside of the portion 33 common to the channels 31 and 32. However, the mixing and temperature-homogenization of the coolant is less intense than in the case of the device shown in FIGS. 1, 2 and 3, owing to the absence of a chamber for mixing by cyclone effect.

The device according to the second embodiment shown in FIGS. 4 and 5 also renders it more difficult to mount a backup probe and a flow rate measurement device in the metallic body.

Figure 6:
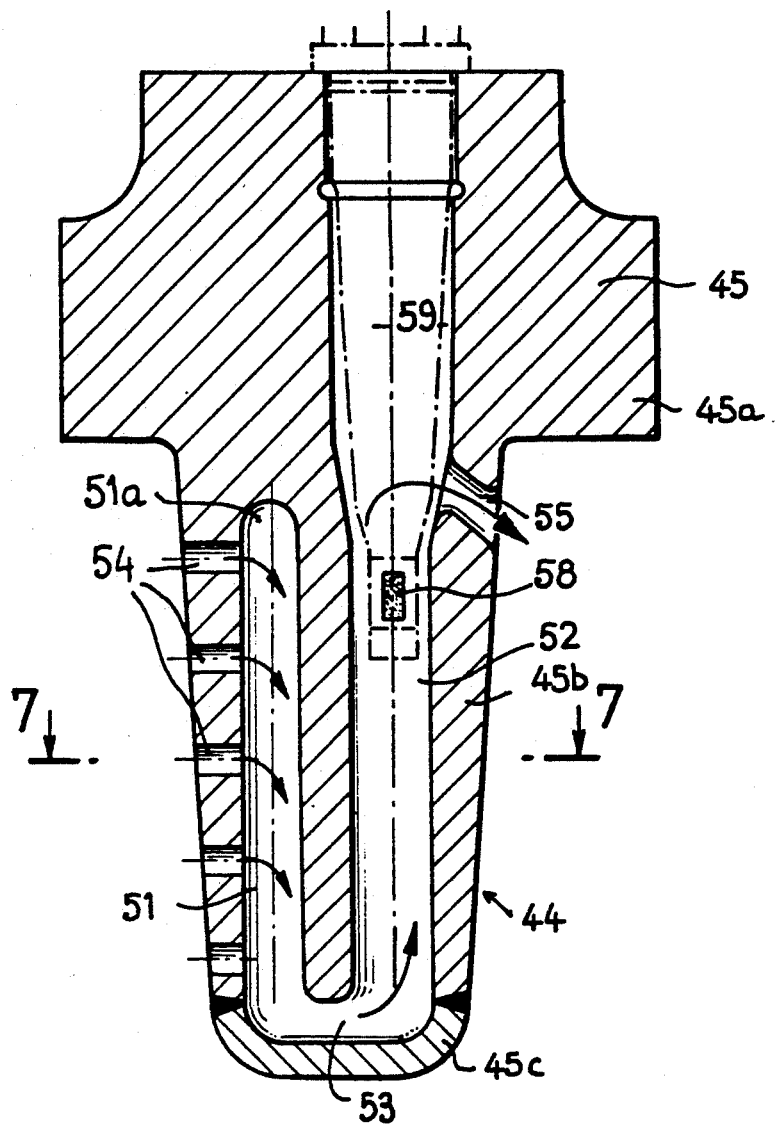
FIG. 6 is a view in axial cross-section of a third embodiment of the device according to the invention.
Figure 7:
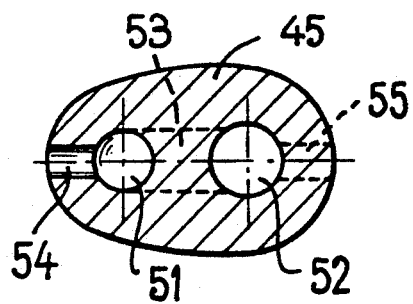
FIG. 7 is a view in cross-section along line 7—7 of FIG. 6.

FIGS. 6 and 7 show a third embodiment of a scoop 44 of a temperature measurement device according to the invention.

In this embodiments the metallic body 45 of the scoop 44 is not constructed as a single part as in the case of the scoops shown in FIGS. 1 and 4, but comprises a solid portion 45a which is fixed by welding in a reactor coolant pipe and which comprises an extension 45b projecting inside the reactor coolant pipe and a sealing base 45c inserted and welded to the end of the extension 45b of the metallic body 45.

The portions 45a and 45b of the metallic body 45 are pierced in such a manner as to constitute two parallel channels 51 and 52 extending radially of the pipe on which the scoop 44 is mounted.

The channels 51 and 52 are connected to each other by a common portion 53 substantially perpendicular to the channels 51 and 52 and their common portion.

The channels 51 and 52 and their common portion 53 form a U-shape. The channel 51 comprises a closed end 51a and the channel 52 emerges at the external surface of the metallic body 45.

Openings 54 distributed along the longitudinal direction of the channel 51 are pierced in the frontal portion of the metallic support 45, in such a manner as to bring the channel 51 at different levels into communication with the inner volume of the pipe on which the scoop 44 is mounted.

A coolant outlet opening 55 bringing the channel 52 into communication with the inner volume of the pipe is machined in the metallic body 45, opposite the openings 54.

The channel 52 is internally machined in order to receive a probe support 59 which is fixed on the metallic body 45. A temperature measurement probe 58 is mounted on the end of the support 59 in the outlet portion of the channel 52, adjacent to opening 55.

The coolant flowing through the pipe penetrates into the channel 51 through openings 4, in such a manner as to flow in sequence into the channel 51, into the common portion 53 and into the channel 52, before reemerging from the scoop through opening 55.

A suction and a sucking action occurs at the opening 55, such that the flow of the coolant in the U shaped conduit constituted by the channel 51, the channel 52 and the common portion 53 is greatly accelerated.

The device according to the third embodiment shown in FIGS. 6 and 7 has the same disadvantages as the device according to the second embodiment shown in FIGS. 4 and 5, relative to the device according to the first embodiment constituting the preferred embodiment.

In all cases, the coolant flows at high speed inside the scoop and the mixing of the coolant samplings before the temperature is measured remains sufficient for the measurement to be representative of the temperature of the primary coolant.

In relation to the devices according to the prior art comprising interconnection piping inside the reactor coolant pipe, the device according to the invention has much greater reliability, insofar as the primary coolant remains inside the reactor coolant pipe and a solid metallic body fixed by welding into the wall of the reactor coolant pipe. Furthermore, the thermal insulation of the reactor coolant pipe may be carried out simply, since only a small portion of the scoop projects from the outer surface of the pipe.

The welds for fixing the scoop may be easily monitored by radiography.

In the case of the device according to the first embodiment, it is furthermore simple to mount a backup probe and a device making it possible to check by ultrasound whether the flow of the coolant in the scoop is satisfactory.

Thus it is possible to use scoops having different shapes and comprising channels having a relative disposition different from those which have been described.

The measurement devices according to the invention may be combined in any number in order to take temperature measurements at various points of the reactor coolant pipe.

Finally, the invention is applicable to the temperature measurement of a coolant in any nuclear reactor in which the coolant flows in pipes of a primary cooling system.

I claim:

1. Device for measuring a temperature of a primary coolant of a nuclear reactor comprising a vessel in which a core of said reactor is disposed and a primary cooling system having at least one loop on which a steam generator is disposed and which comprises pipes in which said primary coolant of the reactor flows, said measuring device comprising a metallic body fixed in a wall of a reactor coolant pipe, said metallic body comprising a portion projecting inside said reactor coolant pipe and pierced by at least two channels communicating with an inner volume of said reactor coolant pipe through openings and enclosing a temperature measurement probe,
    (a) wherein said two channels extend substantially radially of said reactor coolant pipe and are connected to each other in the vicinity of ends of said channels;
    (b) a first of said channels communicating with said inner volume of said reactor coolant pipe by a plurality of coolant inlet openings distributed substantially radially of said metallic body; and
    (c) a second of said channels communicating with said inner volume of said reactor coolant pipe by at least one coolant outlet opening and enclosing said temperature measurement probe, in a zone situated between an end of said second channel which end is connected to an end of said first channel, and said coolant outlet opening.

2. Device according to claim 1, wherein said coolant inlet openings are located on a frontal face of the portion of the metallic body projecting inside said reactor coolant pipe, in a flow direction of said coolant, and said coolant outlet opening is located opposite said coolant inlet openings, in said flow direction of said coolant in said reactor coolant pipe.

3. Device according to claim 1 or 2, wherein said first channel is linear and comprises a closed end inside said portion of said metallic body projecting inside said reactor coolant pipe and a second end emerging at a surface of said metallic body disposed on an exterior of said reactor coolant pipe.

4. Device according to claim 3, wherein said metallic body is pierced so as to constitute a channel intersecting said first channel and said second channel and comprising a connecting portion between said first channel and said second channel.

5. Device according to claim 4, wherein said second channel comprises a substantially cylindrical portion into which emerges said connecting portion of said channel, in a disposition eccentric to an axis of said second channel and in a direction substantially tangential to a wall of said cylindrical portion of said second channel.

6. Device according to claim 3, wherein said second channel comprises a closed end situated inside said portion of said metallic body projecting inside said reactor coolant pipe and an opposite end emerging at a surface of said metallic body and disposed on an outside of said reactor coolant pipe, said coolant outlet opening being in communication with said second channel adjacent the closed end of said second channel.

7. Device according to claim 1 or 2, wherein said first channel and said second channel are connected to each other in a portion of said metallic body situated outside said reactor coolant pipe.

8. Device according to claim 1 or 2, wherein said first channel and said second channel are connected to each other by a common portion disposed inside said portion of said metallic body projecting inside said reactor coolant pipe.

9. Device according to claim 8, wherein said first channel and said second channel have concurrent axes forming an acute angle and constitute a V-shaped conduit inside said metallic body.

10. Device according to claim 8, wherein said first channel and said second channel have substantially parallel axes and are connected by a channel, in such a manner as to constitute a U-shaped conduit inside said metallic body.

* * * * *